United States Patent [19]

Iturralde

[11] Patent Number: 5,683,060
[45] Date of Patent: Nov. 4, 1997

[54] AIR VEHICLE

[76] Inventor: Miguel A. Iturralde, 1450 SW. 87th Ave., Apt. J, Miami, Fla. 33174

[21] Appl. No.: 489,058

[22] Filed: Jun. 9, 1995

[51] Int. Cl.$^6$ .............. B64B 1/36; B64C 29/00; B64C 17/06; B64G 1/44
[52] U.S. Cl. .............. 244/23 C; 244/5; 244/76 J; 244/165; 244/168
[58] Field of Search .............. 244/5, 17.15, 23 R, 244/23 C, 24, 29, 30, 32, 73 C, 76 J, 96, 98, 105, 107, 165, 168, 169, 173

[56] References Cited

U.S. PATENT DOCUMENTS

| | | | |
|---|---|---|---|
| 1,001,995 | 8/1911 | Schutte | 244/97 |
| 2,621,874 | 12/1952 | Boyle | 244/105 |
| 2,939,654 | 6/1960 | Coanda | 244/23 C |
| 3,542,317 | 11/1970 | Irby | 244/105 |
| 3,633,849 | 1/1972 | Kling | 244/23 C |
| 4,135,325 | 1/1979 | Lehman | 46/74 D |
| 4,461,436 | 7/1984 | Messina | 244/23 C |
| 4,799,629 | 1/1989 | Mori | 244/30 |
| 4,934,631 | 6/1990 | Birbas | 244/30 |
| 5,026,003 | 6/1991 | Smith | 244/26 |
| 5,351,911 | 10/1994 | Neumayr | 244/5 |

Primary Examiner—Andres Kashnikow
Assistant Examiner—Virna Lissi Mojica
Attorney, Agent, or Firm—Richard L. Miller, P.E.

[57] ABSTRACT

An air vehicle that includes a body lower portion, a body intermediate portion, body lower portion, a solar panel, elevating apparatus, gimbling apparatus, and inflatable landing gear. The body lower portion has a body lower portion outer surface and contains a body lower portion chamber. The body intermediate portion has a body intermediate portion upper surface and contains a body intermediate portion chamber. The body intermediate portion is connected to the body lower portion. The body upper portion contains a body upper portion chamber and is displaced a distance above the body intermediate portion. The solar panel has a solar panel outer surface and contains a solar panel void. The solar panel connects the body upper portion to the body intermediate portion. The elevating apparatus raises and lowers the air vehicle and is disposed within the body upper portion chamber. The gimbling apparatus rotates, tilts, and laterally moves the air vehicle and is disposed on the body intermediate portion upper surface and passes through the solar panel void. An inflatable landing gear is disposed on the body lower portion so that the air vehicle can readily land on and take off from the sea.

14 Claims, 2 Drawing Sheets

AIR VEHICLE

BACKGROUND OF THE INVENTION

The present invention relates to an air vehicle. More particularly, the present invention relates to an air vehicle that includes variable-lift floatation balloons, a 360 degree rotatable cabin, and floatation pontoons for amphibious use.

In the past, there have been designed and used a series of dirigible designs, other types of lighter-than-air type vehicles, hot-air types of balloons, and so forth. Such are designed for varying uses including passenger transport, rescue work, lift capabilities for timber operations, and also transport of goods and supplies.

The transportation system of this country offers a variety of conveyances for moving goods and passengers from one location to another. The conveyances one chooses to a large measure depends on what is to be transported and the origin and destination of the trip. Certainly, fixed wing aircraft constitute the quickest practical mode of delivering goods and passengers from one location to another, provided that each location has a suitable airport. However, airports capable of accommodating large fixed wing aircraft are widely dispersed, leaving many regions of the country without access to this mode of transportation. Railroads, while passing through many communities, have transfer facilities only at scattered locations. Boats and ships of course only service ports having adequate docking facilities. Trucks and passenger vehicles can service any location to which a road leads, but the capacities of these conveyances are limited.

Numerous innovations for air vehicles have been provided in the prior art that will be described. However, even though these innovations may be suitable for the specific individual purposes to which they address, they differ from the present invention.

For example, U.S. Pat. No. 4,135,325 to Lehman teaches a hand tossed flying saucer toy that is inflatable from a central valve member. The peripheral of the depending lip is substantially circular in cross-section.

Another example, U.S. Pat. No. 4,461,436 to Messina teaches a model flying saucer shaped body that is provided with lift by use of a thrust producing device that includes an engine and a propeller. The body is prevented from rotating by use of counter-rotational fins.

Still another example, U.S. Pat. No. 4,934,631 to Birbas teaches a lighter-than-air type vehicle that includes a framework and a series of inflatable lift bags that are secured to the framework. The bags contain heating elements and a gas. The gas is in contact with the heating elements. A source of power is coupled to the heating elements. Propulsion structure is affixed to the framework and includes a pair of oppositely revolving propellers which are independently controlled. A shroud and interior plate-like vanes surround the propellers.

Finally, another example, U.S. Pat. No. 5,026,003 to Smith teaches a lighter-than-air aircraft that includes a rigid platform that has cargo and passenger compartments and gas bags attached to the platform for holding a gas. The bags are arranged in pairs that include a pair of spaced apart upper bags along the upper surface of the platform and a pair of spaced apart lower bags along the lower surface. The platform s provided with vertical ducts and bays. The ducts house motors and propellers which drive air through the ducts. The bays hold containers which are lowered from and raised into the bays by a crane that moves along tracks extended along the upper surface of the platform. Along the sides of the platform are nacelles which house motors and propellers. Rudders are in the regions between the upper gas bags and in the regions between the lower gas bags.

It is apparent that numerous innovations for air vehicles have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, it is an object of the present invention to provide an air vehicle that avoids the disadvantages of the prior air.

Another object of the present invention is to provide an air vehicle that is simple and inexpensive to manufacture.

Still another object of the present invention is to provide an air vehicle that is simple to operate.

Yet another object of the present invention is to provide an air vehicle that includes a body lower portion, a body intermediate portion, body lower portion, a solar panel, elevating apparatus, gimbling apparatus, and inflatable landing gear. The body lower portion has a body lower portion outer surface and contains a body lower portion chamber.

Still yet another object of the present invention is to provide an air vehicle wherein the body intermediate portion has a body intermediate portion upper surface and contains a body intermediate portion chamber.

Yet still another object of the present invention is to provide an air vehicle wherein the body intermediate portion is connected to the body lower portion.

Still yet another object of the present invention is to provide an air vehicle wherein the a body upper portion contains a body upper portion chamber and is displaced a distance above the body intermediate portion.

Yet still another object of the present invention is to provide an air vehicle wherein the solar panel has a solar panel outer surface and contains a solar panel void.

Still yet another object of the present invention is to provide an air vehicle wherein the solar panel connects the body upper portion to the body intermediate portion.

Yet still another object of the present invention is to provide an air vehicle wherein the elevating apparatus raises and lowers the air vehicle and is disposed within the body upper portion chamber.

Still yet another object of the present invention is to provide an air vehicle wherein the gimbling apparatus rotates, tilts, and laterally moves the air vehicle and is disposed on the body intermediate portion upper surface and passes through the solar panel void.

Yet still another object of the present invention is to provide an air vehicle wherein the inflatable landing gear is disposed on the body lower portion so that the air vehicle can readily land on and take off from the sea.

Still yet another object of the present invention is to provide an air vehicle wherein the elevating apparatus includes a plurality of helium balloons disposed in a ring-like configuration and connected to each other by a hollow ring.

Yet still another object of the present invention is to provide an air vehicle wherein the elevating apparatus further includes a plurality of helium tanks connected to the hollow ring by a plurality of hollow feed conduits so that helium gas contained in the plurality of helium tanks passes through the plurality of hollow feed conduits through the hollow ring and ultimately into the plurality of helium balloons.

Still yet another object of the present invention is to provide an air vehicle wherein the elevating apparatus further includes resistors disposed within the plurality of helium balloons so that the temperature and density of the helium gas can be varied.

Yet still another object of the present invention is to provide an air vehicle wherein the gimbling apparatus includes a motor, a universal joint connected to the motor, at least one hollow arm connected to the universal joint, a jet engine attached to each of the at least one hollow arm, at least one fuel tank disposed on the body intermediate portion upper surface and supplying fuel through the at least one hollow arm to the jet engine, and at least one battery disposed on the body intermediate portion top surface for powering the motor.

Still yet another object of the present invention is to provide an air vehicle wherein the at least one arm is three arms.

Yet still another object of the present invention is to provide an air vehicle wherein the landing gear includes at least two landing gear subassemblies.

Still yet another object of the present invention is to provide an air vehicle wherein each of the at least two landing gear subassemblies includes a body member that has a body member upper end connected to the body lower portion outer surface and a body member lower end connected to a inflatable pad so that when the inflatable pad is inflated the air vehicle can land on and takeoff from the sea.

Yet still another object of the present invention is to provide an air vehicle that further includes a command module disposed within the body lower portion chamber.

Still yet another object of the present invention is to provide an air vehicle wherein the command module has a control panel, computer, and pilot provisions.

Yet still another object of the present invention is to provide an air vehicle wherein the universal joint allows the at least one arm to pivot upwardly through an angle of 45 degrees.

Still yet another object of the present invention is to provide an air vehicle wherein the universal joint allows the at least one arm to rotate through an angle of 360 degrees.

Yet still another object of the present invention is to provide an air vehicle that further includes a hatch disposed on said body lower portion so that a user may enter and leave the air vehicle.

Finally, another object of the present invention is to provide an air vehicle that further includes solar cells disposed on the solar panel outer surface.

The novel features which are considered characteristic of the present invention are set forth in the appended claims. The invention itself, however, both as to its construction and method of operation, together with additional objects and advantages thereof, will be best understood from the following description of the specific embodiments when read and understood in connection with the accompanying drawing.

Figure 1:
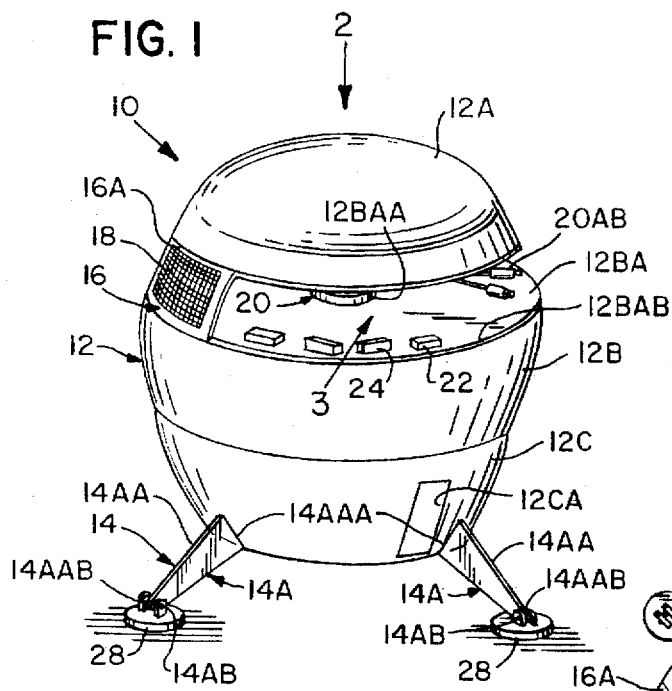
FIG. 1 is a diagrammatic prospective view of the instant invention.

LIST OF REFERENCE NUMERALS UTILIZED IN THE DRAWING 10-air vehicle of the present invention
12-body
12A-body upper portion
12AA-body upper portion chamber
12AB-upper body portion lower surface
12B-body intermediate portion
12BA-body intermediate portion upper surface
12BAA-body intermediate portion upper surface center
12BAB-body intermediate portion upper surface perimeter
12BB-body intermediate portion chamber
12C-body lower portion
12CA-body lower portion chamber
12CB-body lower portion chamber
14-landing gear
14A-landing gear leg
14AA-landing gear leg body portion
14AAA-landing gear leg body portion upper end
14AAB-landing gear leg body portion lower end
14AB-landing gear pivot joint
16-solar panel
16A-solar panel outer surface
18-solar cells
20-gimbling arrangement
20AA-gimbling arrangement arm
20AAA-rocket portion hollow arm end
20AB-gimbling arrangement jet engine
22-plurality of batteries
24-plurality of fuel tanks
28-inflatable pad
30-command module
30A-command module control panel
30B-command module pilot provision
32-electric motor
34-lift apparatus
36-helium balloon
38-ring connector
40-electric resistor
41-fuel tank
42-feed conduit

DETAILED DESCRIPTION OF THE PREFERRED EMBODIMENT

Figure 2:
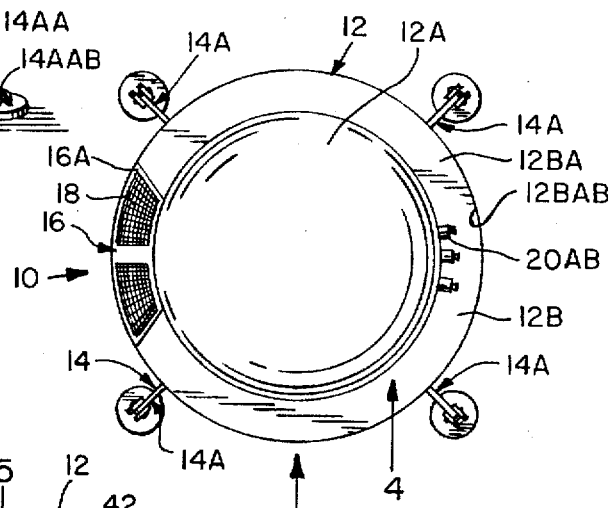
FIG. 2 is a top plan view taken in the direction of arrow 2 in FIG. 1.

Referring now to the figures in which like numerals indicate like parts, and particularly to FIGS. 1 and 2, the air vehicle of the present invention is shown generally at 10 and includes a body 12 and landing gear 14.

The body 12 is lightweight fiberglass or cardboard, but is not limited to that, and is mounted to a lightweight aluminum frame (not shown). The body 12 includes a body upper portion 12A, a body intermediate portion 12B, and a body lower portion 12C. The body upper portion 12A is substantially hemispherical in shape and is attached to the body intermediate portion 12B by a solar battery panel 16. The solar battery panel 16 has a solar panel outer surface 16A on which is mounted a plurality of solar cells 18.

The body intermediate portion 12B is attached to the body lower portion 12C and has a body intermediate portion upper surface 12BA. The body intermediate portion upper surface 12BA has a body intermediate portion upper surface center 12BAA and a body intermediate portion upper surface perimeter 12BAB. An electric gimbling rocket arrangement 20 is located at the body intermediate portion upper surface center 12BAA. A plurality of batteries 22 and a plurality of fuel tanks 24 are located at the body intermediate portion upper surface perimeter 12BAB.

The plurality of batteries 22 are recharged by the plurality of solar cells 18 and supply power to operate the electric gimbling rocket arrangement 20.

The lower body portion 12C contains a lower body portion hatch 12CA that allows entrance into the air vehicle 10.

The landing gear 14 includes a plurality of landing gear legs 14A. Each of the plurality of landing gear legs 14A includes a landing gear leg body portion 14AA which is attached to the lower body portion 12C at a landing gear leg body portion upper end 14AAA. A landing gear leg pivot joint 14AB is located at a landing gear leg body portion lower end 14AAB and pivotally connects the landing gear leg body portion 14AA to an inflatable pontoon 28. The use of the inflatable pontoons 28 allow the air vehicle 10 to be used at sea, that is, for takeoff and landing.

Figure 3:
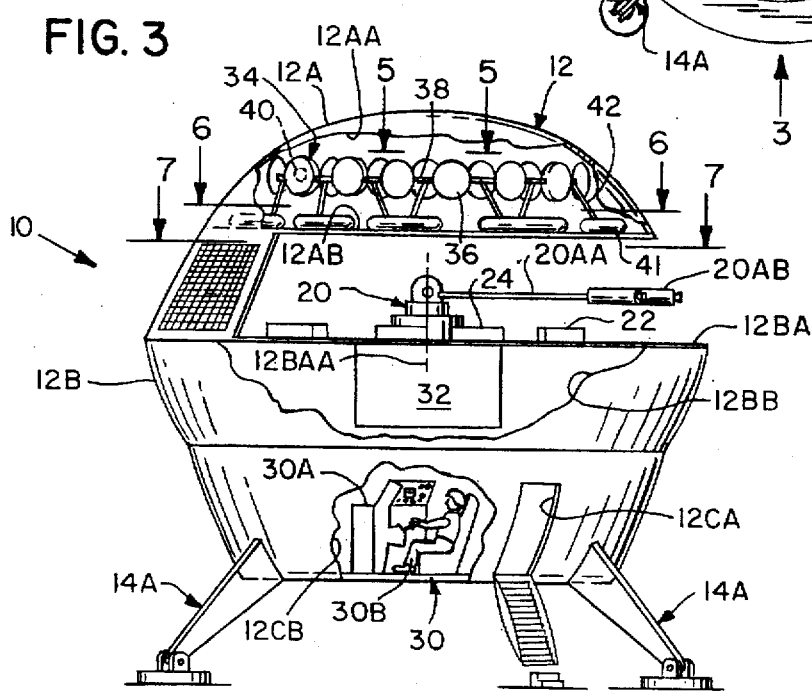
FIG. 3 is an enlarged diagrammatic view with parts broken away taken in the direction of arrow 3 in FIG. 2.

As can be seen in FIG. 3, the body upper portion 12A contains a body upper portion chamber 12AA, the body intermediate portion 12B contains a body intermediate portion the chamber 12BA, and the body lower portion 12C contains a body lower portion chamber 12CA.

Contained within the body lower portion chamber 12CB is a command module 30. The command module 30 includes a control panel 30A which is connected to operating computers and displays (not shown) and provisions for a pilot 30B. The hatch 12CA allows the pilot 30 to enter the command module 30.

Contained within the body intermediate portion chamber 12BB is a motor 32 which operates the gimbling rocket arrangement 20 for rotational, tilt, and lateral movement.

Figure 4:
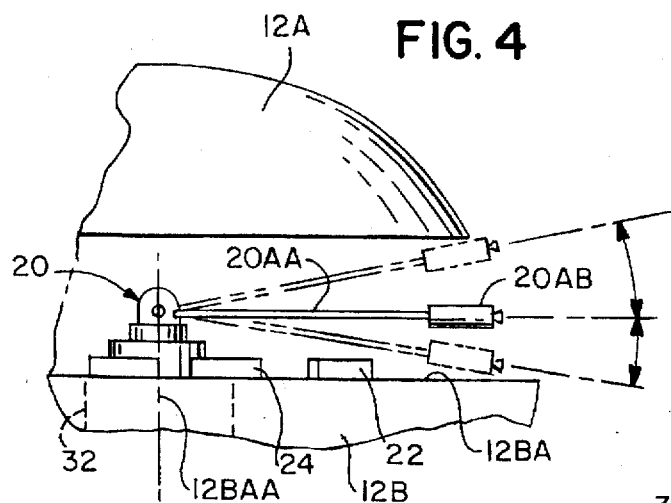
FIG. 4 is an enlarged diagrammatic side elevational view with parts broken away taken in the direction of arrow 4 in FIG. 2.
Figure 7:
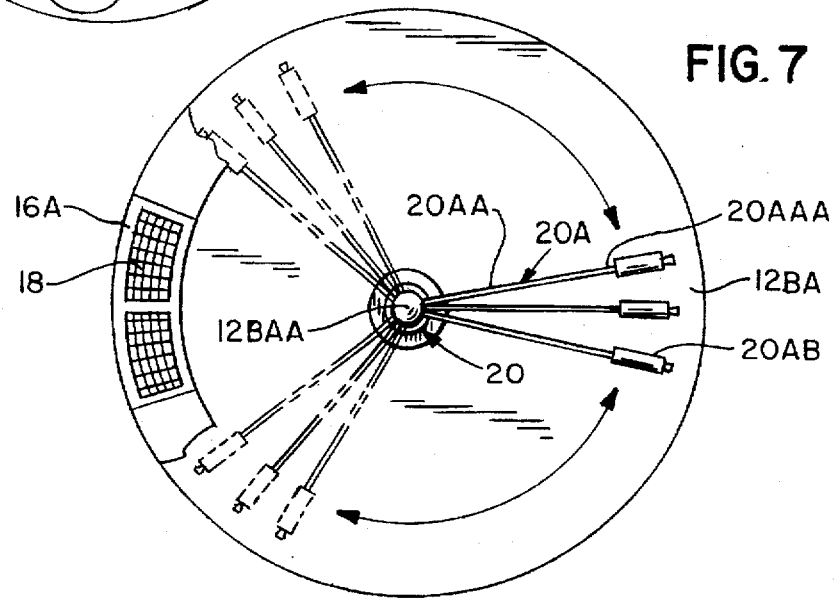
FIG. 7 is a diagrammatic plan view taken along line 7—7 of FIG. 3.

The configuration and operation of the gimbling rocket arrangement 20 can best be seen in FIGS. 3, 4 and 7, and as such, will be discussed with reference thereto. The gimbling rocket arrangement 20 includes three individual rocket portions 20A which are rigidly affixed to each other and can be rotated 360 degrees around and 45 degrees above the intermediate body portion upper surface center 12BAA. Each rocket portion 20A includes a rocket portion hollow arm 20AA that has a rocket portion hollow arm end 20AAA to which is attached a rocket portion jet engine 20AB.

In operation, when the pilot 30B decides that the air vehicle 10 is to be rotated and/or tilted and/or moved laterally, motor 32 is activated via the control panel 30A, causing the individual rocket portions 20 to be either rotated and/or elevated. Once the individual rocket portions 20A are positioned, the pilot 30B fires the rocket portion jet engines 20AB, via the control panel 30A. Fuel is carried from the fuel tanks 24 through the rocket portion hollow arm 20AA to the rocket portion jet engine 20AB.

Figure 5:
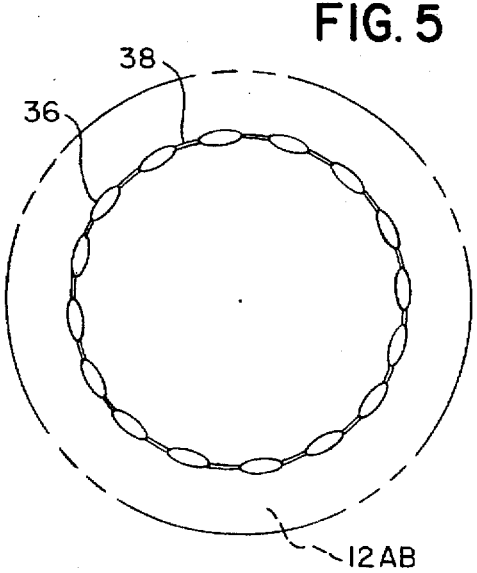
FIG. 5 is a diagrammatic plan view taken along line 5—5 of FIG. 3.
Figure 6:
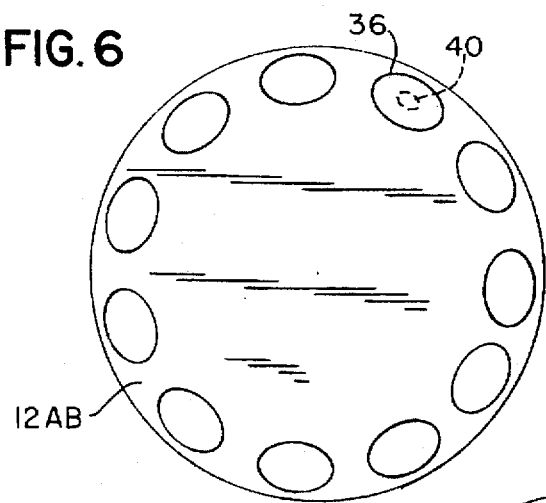
FIG. 6 is a diagrammatic plan view taken along line 6—6 of FIG. 3.

Contained within the upper body portion chamber 12AA is a lift apparatus 34 which provides lift for the air vehicle 10. The configuration and operation of the lift apparatus 34 can best be seen in FIGS. 3, 5 and 6, and as such, will be discussed with reference thereto.

The lift apparatus 34 includes a plurality of helium bags 36 that are arranged in a ring-like configuration by a hollow ring support 38. Each of the helium bags 36 contain an electric resistor 40 that changes the temperature and density of the helium gas contained within the plurality of helium bags 36. By changing the temperature and/or density of the helium gas more or less lift is provided so that elevational positioning of the air vehicle can be accomplished. Located on the upper body portion lower surface 12AB is a plurality of helium tanks 41 in which the helium gas is stored. The helium gas is fed to the plurality of helium bags 36 via a plurality of hollow conduits 42 and the hollow ring support 38.

In operation, when the pilot 30B decides that the air vehicle 10 is to be either raised or lowered, the electric resistors 40 are activated via the control panel 30A.

It will be understood that each of the elements described above, or two or more together, may also find a useful application in other types of constructions differing from the types described above.

While the invention has been illustrated and described as embodied in an air vehicle, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

The invention claimed is:

1. An air vehicle, comprising:
   a) a body lower portion having a body lower portion outer surface and containing a body lower portion chamber;
   b) a body intermediate portion having a body intermediate portion upper surface and containing a body intermediate portion chamber, said body intermediate portion being connected to said body lower portion;
   c) a body upper portion containing a body upper portion chamber and being displaced a distance above said body intermediate portion;
   d) a solar panel structure having a solar panel outer surface and containing a solar panel structure opening, said solar panel structure connecting said body upper portion to said body intermediate portion;
   e) elevating means for raising and lowering said air vehicle and being disposed within said body upper portion chamber;
   f) gimbling means for rotating, tilting, and lateral moving of said air vehicle and being disposed on said body intermediate portion upper surface and passing through said solar panel structure opening; and
   g) inflatable landing gear disposed on said body lower portion so that said air vehicle can readily land on and take off from the sea.

2. The air vehicle as defined in claim 1, wherein said elevating means includes a plurality of helium balloons disposed in a ring-like configuration and connected to each other by a hollow ring.

3. The air vehicle as defined in claim 2, wherein said elevating means further includes a plurality of helium tanks connected to said hollow ring by a plurality of hollow feed conduits so that helium gas contained in said plurality of helium tanks passes through said plurality of hollow feed conduits through said hollow ring and ultimately into said plurality of helium balloons.

4. The air vehicle as defined in claim 3, wherein said elevating means further includes resistors disposed within said plurality of helium balloons so that the temperature and density of the helium gas can be varied.

5. The air vehicle as defined in claim 1, wherein said gimbling means includes a motor, a universal joint connected to said motor, at least one hollow arm connected to said universal joint, a jet engine attached to each of said at least one hollow arm, at least one fuel tank disposed on said body intermediate portion upper surface and supplying fuel through said at least one hollow arm to said jet engine, and at least one battery disposed on said body intermediate portion top surface for powering said motor.

6. The air vehicle as defined in claim 5, wherein said at least one arm is three arms.

7. The air vehicle as defined in claim 1, wherein said landing gear includes at least two landing gear subassemblies.

8. The air vehicle as defined in claim 7, wherein each of said at least two landing gear subassemblies includes a body member that has a body member upper end connected to said body lower portion outer surface and a body member lower end connected to a inflatable pad so that when said inflatable pad is inflated said air vehicle can land on and takeoff from the sea.

9. The air vehicle as defined in claim 1; further comprising a command module disposed within said body lower portion chamber.

10. The air vehicle as defined in claim 9, wherein said command module has a control panel, computer, and pilot provisions.

11. The air vehicle as defined in claim 5, wherein said universal joint allows said at least one arm to pivot upwardly through an angle of 45 degrees.

12. The air vehicle as defined in claim 11, wherein said universal joint allows said at least one arm to rotate through an angle of 360 degrees.

13. The air vehicle as defined in claim 1; further comprising a hatch disposed on said body lower portion so that a user may enter and leave said air vehicle.

14. The air vehicle as defined in claim 1; further comprising solar cells disposed on said solar panel outer surface.

* * * * *